Jan. 12, 1937. J. E. PADGETT 2,067,281

SHOCK ABSORBING MECHANISM

Filed Feb. 16, 1934

INVENTOR:
JOSEPH E. PADGETT
Kwis Hudson & Kent
ATTORNEYS

Patented Jan. 12, 1937

2,067,281

UNITED STATES PATENT OFFICE 2,067,281

SHOCK ABSORBING MECHANISM

Joseph E. Padgett, Toledo, Ohio, assignor, by mesne assignments, to General Motors Corporation, Detroit, Mich., a corporation of Delaware Application February 16, 1934, Serial No. 711,566

5 Claims. (Cl. 188—89)

This invention relates to a shock absorbing device of the fluid flow type, and more particularly to an improved valve arrangement for controlling the displacement of fluid within the device.

An object of the present invention is to provide an improved fluid flow shock absorber embodying a novel valve structure which is of very simple and economical construction and which efficiently controls the displacement of the fluid to produce a desired double acting shock absorbing function substantially independently of viscosity changes in the fluid.

Another object of this invention is to provide an improved valve structure for a shock absorber of the type mentioned, such valve structure comprising only a pair of cooperating valve plates one of which has a restricted opening for producing a shock absorbing action during a pressure flow of fluid in one direction and the other plate having a flap portion cooperating with the first mentioned plate for further reducing the area of the fluid passage to produce an increased shock absorbing action during the flow of fluid in the opposite direction.

A further object of this invention is to provide an improved valve structure, of the type mentioned, wherein the flap portion of the second valve element is of relatively thin flexible material, and is provided with an opening of smaller area than the opening of the first valve element and such smaller opening communicates with the opening of the first valve element and further restricts the same when the flap is seated against the first valve element by the fluid pressure.

It is also an object of this invention to provide an improved shock absorbing device having an oscillating piston which is provided with a fluid transfer passage and with a novel valve structure for controlling the transfer passage, such valve structure comprising a pair of cooperating valve elements, one valve element having a restricted opening therein for reducing the transfer passage to a relatively small area to produce a shock absorbing action during a pressure flow of fluid in one direction through the passage, and the other valve element being a relatively thin plate having a flap portion adapted to be seated against the first mentioned valve element and such flap portion having a restricted opening of smaller area which communicates with the opening of the first mentioned valve element and reduces the effective area of the same when the flap portion is seated thereagainst.

Other objects and advantages of this invention will be apparent from the following description when taken in conjunction with the accompanying sheet of drawings, wherein Fig. 1 is an outside elevational view of a shock absorber embodying my invention.

Figure 2:
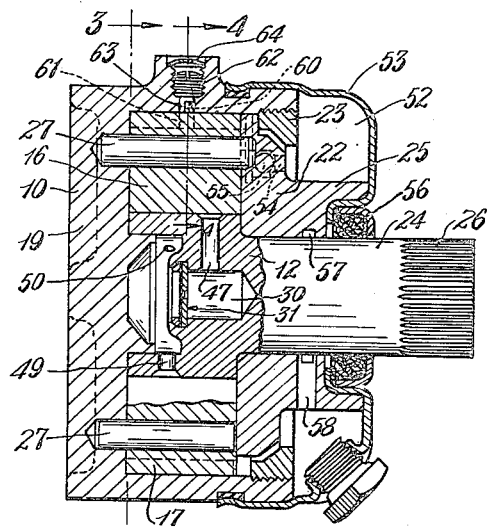
Fig. 2 is a transverse sectional view taken through the shock absorber as indicated by the line 2—2 of Fig. 1.

In the accompanying drawing to which detailed reference will now be made, I have illustrated my improved shock absorber which is of the fluid flow type and which embodies a novel and efficient control valve of very economical construction. Although the drawing shows my novel valve structure embodied in a shock absorber of the oscillating piston type, it will be understood, of course, that the invention is not necessarily limited to use with this particular type of shock absorber, but may be used in various other shock absorbing devices.

Figure 3:
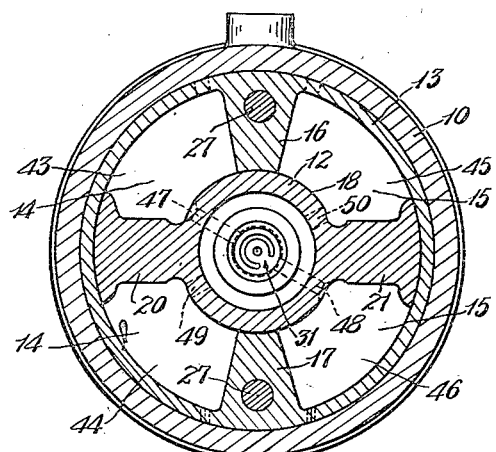
Fig. 3 is another sectional view through the shock absorber taken as indicated by line 3—3 of Fig. 2.
Figure 4:
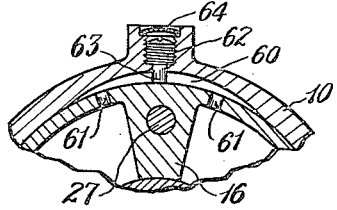
Fig. 4 is a partial sectional view taken as indicated by line 4—4 of Fig. 2 and illustrating the adjusting or calibrating means.

As mentioned above, the shock absorber illustrated in the drawing is a fluid flow shock absorber of the oscillating piston type and, in general, comprises a casing 10 having a cylinder chamber therein and a piston 12 arranged for oscillation in the cylinder chamber. As shown in Figs. 2 and 3 of the drawing, the casing 10 is substantially cup-shaped so as to provide the cylinder chamber therein, and a liner 13 assembled in the casing cooperates with the piston 12 to divide the cylinder chamber into a pair of arcuate working chambers 14 and 15. The liner 13 is constructed with substantially radially extending abutments 16 and 17 which extend inwardly and bear against the hub portion 18 of the oscillating piston. These abutments form the end walls of the arcuate working chambers 14 and 15.

The piston 12 may be constructed with opposed substantially radially extending vanes 20 and 21, which extend outwardly from the hub portion 18 and into working contact with the ends of the cylinder chamber and with the liner 13 so as to operate respectively in the chambers 14 and 15. The casing 10 may be provided at one end with an integral closure wall 19, and at the opposite end with a closure cover 22 which may be retained in the desired position in engagement with the liner by means of the clamping ring 23 which is screwed into the outer end of the casing. The piston 12 is provided with a shaft 24 which extends laterally from the hub portion 18 and projects outwardly through a bearing sleeve 25 provided on the closure cover. The piston shaft may be formed at its outer end with a serrated portion 26 upon which a suitable lever or other power transmitting element may be mounted. In addition to the clamping action exerted by the ring 23, the liner 13 may be retained in the desired position within the casing by means of dowel pins 27 which are mounted in openings of the abutments 16 and 17 and extend into openings provided in the end wall 19 of the casing, as shown in Fig. 2.

Figure 5:
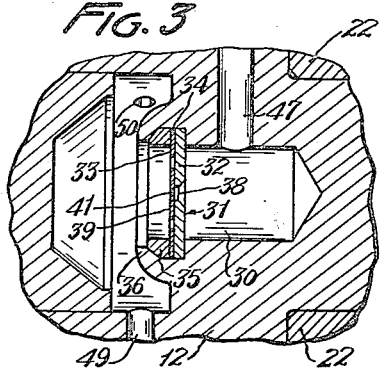
Fig. 5 is a partial sectional view showing the valve structure on a somewhat larger scale than in Fig. 2.
Figure 1:
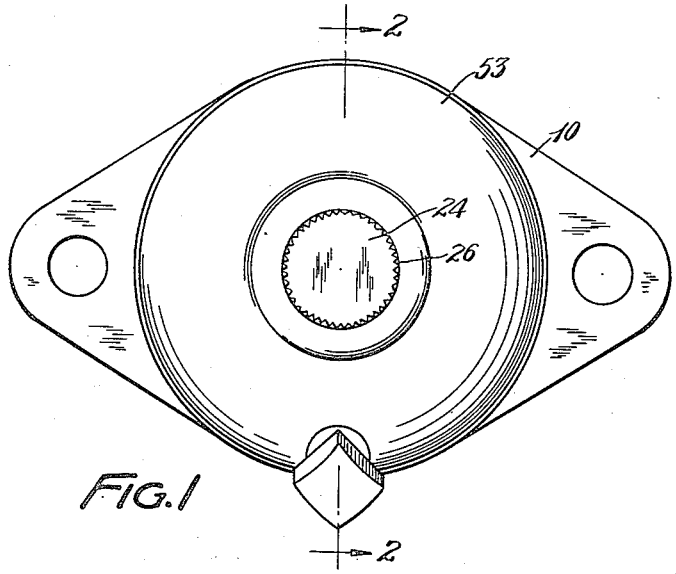

The hub portion of the piston is preferably hollow, as shown in Figs. 2, 3 and 5 and contains a fluid transfer passage or chamber 30 in which the control valve 31 is mounted. As shown in the drawing the control valve extends transversely of the piston passage and comprises a pair of cooperative valve elements 32 and 33. These valve elements are preferably of plate-like form and may comprise discs which are arranged in face to face surface contact with each other. These valve elements may be mounted in the piston structure in any suitable manner, for example, they may be mounted as shown in this instance, by providing the piston hub with a counterbored recess 34. The valve discs may be retained in this recess by a retaining ring 35 or by peening over the edge of the counterbored recess to form a retaining ring or shoulder 36, or by both of these means.

Figure 7:
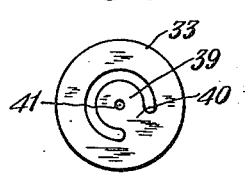
Fig. 7 is a detached elevational view showing the valve element which is provided with the flap portion.

The valve disc 32 is formed with a restricted opening 38 therethrough which is of such size that it reduces the area of the piston passage 30 to a relatively small area so as to produce a shock absorbing action when the fluid is forced through the restricted opening. The valve disc 33 is constructed with a relatively thin flexible flap portion 39, which is adapted to be seated against the valve disc 32 around the restricted opening 38 therein. This flexible flap may be formed by cutting out a portion of the disc and leaving the desired flap portion connected to the rim of the disc by the integral portion 40, as shown in Fig. 7. A restricted opening 41 of smaller diameter than the opening 38 is formed through the flap portion 39 so as to communicate with the restricted opening 38 when the flap portion is seated against the valve disc 32 as shown in Fig. 5.

The valve disc 33 is preferably constructed of relatively thin material, so that the flap portion 39 will be flexible and adapted for movement relative to the valve disc 32 by the action of the fluid in the piston passage, and also so that the restricted opening 41 through the flap portion will be a relatively short passage. The advantage in having the restricted passage 41 a relatively short passage is that viscosity changes occurring in the fluid, by reason of temperature variations or other causes, do not materially affect the rate of flow through this restricted passage. In other words, when the passage 41 is relatively short, the flow of fluid therethrough takes place at a rate substantially independent of viscosity changes in the fluid.

Figure 6:
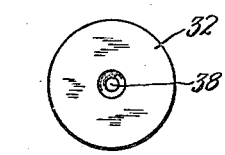
Fig. 6 is a detached elevational view showing one of the valve elements.

It is usually desirable, although not altogether necessary, that the valve disc 32 be constructed of thicker material than the valve disc 33, so that the valve disc 32 will form a comparatively rigid support against which the flap 39 may be seated by the fluid. If desired, the restricted opening 38 may also be made relatively short so as to avoid variations in the rate of flow therethrough due to viscosity changes in the fluid. In the accomplishment of this end the valve disc 32 may be counterbored, as shown in Figs. 5 and 6, leaving a relatively thin web of material through which the restricted opening 38 is formed. It will be understood, of course, that the area of the openings 38 and 41 will be dependent upon various factors but, generally speaking, the size of the opening 38 determines the shock absorbing action to be obtained during the displacement of fluid in one direction and the size of the opening 41 determines the shock absorbing action to be obtained by the displacement of fluid in the opposite direction.

Reverting now to the working chambers 14 and 15 into which the cylinder chamber of the casing 10 is divided by the abutments 16 and 17, it will be noted from Fig. 3 of the drawing that the chamber 14 is further divided into a pair of chambers 43 and 44 by means of the piston vane 20. Likewise, the chamber 15 is further divided into a pair of chambers 45 and 46 by means of the piston vane 21. Upon movement of the piston in one direction in the cylinder, diagonally opposite chambers, for example the chambers 43 and 46, are pressure chambers, and the other pair of diagonal chambers 44 and 45 are at this time fluid receiving chambers. Upon movement of the piston in the opposite direction, the diagonal chambers 44 and 45 become pressure chambers, and chambers 43 and 46 constitute, at this time, fluid receiving chambers. During the operation of the device, the piston is actuated in one direction or the other by relative movement between the vehicle body and the axle, such movement being transmitted to the piston through the shaft 24 and an appropriate lever and linkage connected thereto.

As shown in Figs. 3 and 5, the diagonal chambers 43 and 46 are connected into the piston opening 30 on one side of the valve structure by means of the respective passages 47 and 48. The diagonal chambers 44 and 45 are also connected into the piston opening, but on the opposite side of the valve structure, by means of the respective passages 49 and 50. Thus, at all times during the operation of the device, the chambers 43 and 46 are in direct communication with each other through the piston opening and the passages 47 and 48, and the fluid pressure in these chambers will be equalized at all times. Similarly, chambers 44 and 45 are connected through the piston opening and the passages 49 and 50, and the pressures therein will be equalized at all times.

The arrangement of the shock absorber and the actuating linkage therefor is preferably such that when the vehicle body moves downwardly and the springs are deflected, the piston will be rotated in a clockwise direction, as seen in Fig. 3, and when the rebound movement of the vehicle body occurs, the piston will be rotated in a counterclockwise direction. When the vehicle body moves downwardly and the piston is rotated in a clockwise direction, the fluid in the chambers 43 and 46 is subjected to compression between the piston wings and the abutments and this compressive action causes fluid to be displaced through the openings 47 and 48 and through the restricted opening 38 into the then fluid receiving chambers 44 and 45. During this transfer of fluid through the restricted opening 38, the flap portion 39 is flexed away from the valve disc 32 and the desired shock absorbing action is obtained by the resistance to flow offered by the opening 38. If desired, the valve disc 32 may be constructed with its flap portion 39 of such stiffness that the resistance which the flap portion offers to its being flexed away from the valve disc 32 will afford additional resistance to the flow of fluid through the opening 38.

When the upward or rebound movement of the body takes place, the piston is rotated in a counterclockwise direction and the fluid in chambers 44 and 45 is then subjected to pressure, and chambers 43 and 46 become the fluid receiving chambers. Fluid is then displaced through the passages 49 and 50 into the piston opening, first causing the flap portion 39 to be seated against the valve disc 32, and thereafter causing a flow of fluid through the restricted passage 41 and into the then fluid receiving chambers 43 and 46 through the openings 47 and 48. Since the opening 41 is of smaller area than the opening 38 it will be seen that an increased shock absorbing action is obtained during the movement of the piston corresponding with the rebound action of the vehicle body. By reason of the present valve arrangement, which provides for a greater restriction to the flow of fluid from chambers 44 and 45 to chambers 43 and 46 than in the opposite direction, it will thus be seen that the operating pressure of the fluid usually reaches a higher value in the chambers 44 and 45 than it does in the chambers 43 and 46. It will be understood, of course, that the connecting passages 47, 48 and 49, 50 may be as shown in the drawing or may be reversed, depending upon whether the shock absorber is to be mounted on the right or left hand side of the vehicle.

If desired, a reservoir chamber 52 may be provided as by mounting a sheet metal shell 53 on the casing 10, as shown in Fig. 2. Replenishing fluid may be supplied from the reservoir to the cylinder chamber through the passage 54 which is controlled by a check valve ball 55. Likewise, if desired, a suitable packing 56 may be provided around the shaft 24 to prevent leakage at this point. A leakage collecting groove or recess 57 may also be provided in the shaft bearing 25 just inwardly of the packing 56, and this leakage collecting groove or recess may be connected to the reservoir 52 by means of a return passage 58.

The shock absorber may also be provided with adjusting or calibrating means in the form of a by-pass 60 which communicates with one high pressure chamber and one low pressure chamber through suitable openings 61 provided in the liner. The by-pass 60 may be controlled by a valve element in the form of a screw 62 having a stem extension 63 extending into the by-pass opening. This calibrating means is preferably provided as a factory adjustment and, if desired, a permanent closure 64 may be assembled in the housing just outwardly of the screw 62 after the desired adjustment or calibration has been made.

From the foregoing description and accompanying drawing it will now be readily understood that I have provided an improved shock absorbing device having a very simple and efficient form of fluid flow control valve. It will also be readily understood that the novel valve means which I have provided is of very economical construction and can be readily assembled in the device during the construction thereof, and is not subject to wear or likely to get out of order during the operation of the mechanism. It will be further understood that the novel control valve of my improved device provides for the attainment of the double acting shock absorbing function and accomplishes this function substantially independently of viscosity changes in the fluid.

While I have illustrated and described the improved shock absorbing mechanism of my invention in a detailed manner, it will be understood, of course, that I do not intend to be limited to the precise details of construction and arrangements of parts illustrated and described, but regard my invention as including such changes and modifications as do not involve a departure from the spirit of the invention and the scope of the appended claims.

Having thus described my invention, I claim:

1. In a shock absorber the combination of a fluid-containing casing having a passage therein, means for causing a flow of fluid through said passage alternately in opposite directions, and control means for regulating the flow through said passage, said control means consisting only of a pair of cooperating plate members, one plate member having a restricted opening therethrough and the second plate member having a flap portion movable relative to said one plate member, said flap portion having a restricted opening therethrough of smaller area than the first mentioned restricted opening and which communicates with said first mentioned restricted opening when the flap portion is seated against said one plate member.

2. In a double acting fluid flow shock absorber, the combination of a fluid-containing casing, a piston operable in said casing for subjecting the fluid to pressure, means providing a passage through which fluid is displaced alternately in opposite directions by operation of the piston, and control means associated with said passage for regulating the transfer of fluid therethrough, said control means comprising a pair of cooperating discs, one disc having an opening therethrough restricting said passage to a relatively small area during the flow of fluid in one direction and the other disc having a flexible portion movable into seating engagement with said one disc, said flexible portion having an opening therethrough of smaller area than the first mentioned opening and which further restricts said first mentioned opening during the flow of fluid in the opposite direction.

3. In a double acting fluid flow shock absorber the combination of a fluid-containing casing, a piston operable in said casing for subjecting the fluid to pressure, said piston having a passage through which fluid is displaced alternately in opposite directions by operation of the piston, and control means associated with said passage for regulating the transfer of fluid therethrough, said control means comprising a pair of cooperating discs, one disc having an opening therethrough restricting said passage to a relatively small area during the flow of fluid in one direction and the other disc having a flexible portion movable into seating engagement with said one disc, said flexible portion having an opening therethrough of smaller area than the first mentioned opening and which further restricts said first mentioned opening during the flow of fluid in the opposite direction.

4. In a fluid flow shock absorber the combination of a casing having a fluid-containing cylinder therein, abutments in said cylinder, a piston operable in said cylinder, said piston and abutments cooperating to divide the cylinder into a plurality of pairs of chambers, means providing a passage connecting the chambers of each of said pairs, and means controlling the transfer of fluid from one pair of chambers to the other, said means comprising a pair of plate members one having a restricted opening therethrough and the other having a flexible portion movable relative to said one member and adapted to be seated thereagainst, said flexible portion having an opening therethrough of smaller area than said restricted opening and which communicates with the latter when the flexible portion is seated against said one member.

5. In a fluid flow shock absorber the combination of a casing having a fluid-containing cylinder therein, abutments in said cylinder, a piston operable in said cylinder, said piston and abutments cooperating to divide the cylinder into a plurality of pairs of chambers, said piston having an opening therein, and flow control means in said opening and extending transversely thereof, said piston also having a passage therein connecting the chambers of one of said pairs and communicating with said opening on one side of said control means and a passage connecting the chambers of the other of said pairs and communicating with said opening on the other side of said control means, said control means comprising a support having a relatively short passage of restricted area therethrough and a relatively thin flexible part movable relative to said support and adapted to be seated thereagainst, said flexible part having an opening therethrough of smaller area than the restricted passage and which communicates with the latter when the flexible part is seated against said support.

JOSEPH E. PADGETT.